(12) United States Patent
Arita et al.

(10) Patent No.: US 9,430,887 B2
(45) Date of Patent: Aug. 30, 2016

(54) HYBRID VEHICLE MANAGEMENT SYSTEM, HYBRID VEHICLE CONTROL APPARATUS, AND HYBRID VEHICLE CONTROL METHOD

(71) Applicant: Nissan Motor Co., Ltd., Yokohama-shi, Kanagawa (JP)

(72) Inventors: Hiroshi Arita, Machida (JP); Ryuzo Noguchi, Ebina (JP)

(73) Assignee: Nissan Motor Co., Ltd., Yokohama (JP)

( * ) Notice: Subject to any disclaimer, the term of this patent is extended or adjusted under 35 U.S.C. 154(b) by 52 days.

(21) Appl. No.: 14/370,081

(22) PCT Filed: Jan. 24, 2013

(86) PCT No.: PCT/JP2013/051494
§ 371 (c)(1),
(2) Date: Jul. 1, 2014

(87) PCT Pub. No.: WO2013/111830
PCT Pub. Date: Aug. 1, 2013

(65) Prior Publication Data
US 2014/0365057 A1    Dec. 11, 2014

(30) Foreign Application Priority Data
Jan. 26, 2012  (JP) ................. 2012-014597

(51) Int. Cl.
*B60W 10/00* (2006.01)
*B60W 10/06* (2006.01)
(Continued)

(52) U.S. Cl.
CPC ............ *G07C 5/0841* (2013.01); *B60W 20/12* (2016.01); *F02D 29/02* (2013.01); *B60K 2006/4825* (2013.01); *B60W 2550/143* (2013.01); *B60W 2550/40* (2013.01); *B60W 2550/402* (2013.01);
(Continued)

(58) Field of Classification Search
CPC .... B60W 10/08; B60W 20/00; B60W 10/00; B60W 2510/10; B60K 6/26; B60Y 2200/92; F02N 11/04; F02N 11/0837
See application file for complete search history.

(56) References Cited

U.S. PATENT DOCUMENTS 7,766,107 B2 *  8/2010  Joe ........................... B60K 6/48
                                                          180/65.21
8,041,495 B2 * 10/2011  Kozarekar ............. B60K 6/445
                                                          180/65.28
(Continued)

FOREIGN PATENT DOCUMENTS

| JP | 2000-205000 A | 7/2000 |
| JP | 2005-218178 A | 8/2005 |
| JP | 2009-234565 A | 10/2009 |
| JP | 2009-298271 A | 12/2009 |

*Primary Examiner* — Jerrah Edwards
*Assistant Examiner* — Demetra Smith-Stewart
(74) *Attorney, Agent, or Firm* — Global IP Counselors, LLP

(57) ABSTRACT

A management system is provided for managing a hybrid vehicle having an engine and a motor/generator as power sources. The management system includes an acquisition unit and an area identifying unit. The acquisition unit acquires engine operating information from a plurality of vehicles, during the operation of the motor/generator. The engine operating information includes a moving distance or an engine operating time from the start of to the stop of the engine, and an engine operating position indicating the point at which the engine is operating. The area identifying unit identifies on map data an engine start-up suppressing area in which the start of the engine is suppressed based on the engine operating information.

13 Claims, 7 Drawing Sheets

(51) Int. Cl.
*B60W 20/00* (2016.01)
*B60W 30/188* (2012.01)
*G07C 5/08* (2006.01)
*F02D 29/02* (2006.01)
*B60K 6/48* (2007.10)

(52) U.S. Cl.
CPC ...... *B60W 2550/408* (2013.01); *Y02T 10/6252* (2013.01); *Y10S 903/903* (2013.01)

(56) References Cited

U.S. PATENT DOCUMENTS 8,337,357 B2 * 12/2012 Jerwick .................... B60K 6/48
  477/3
2005/0255966 A1 * 11/2005 Tao ........................ B60K 6/445
  477/27

* cited by examiner

HYBRID VEHICLE MANAGEMENT SYSTEM, HYBRID VEHICLE CONTROL APPARATUS, AND HYBRID VEHICLE CONTROL METHOD

CROSS-REFERENCE TO RELATED APPLICATIONS

This application is a U.S. National stage of International Application No. PCT/JP2013/051494, filed Jan. 24, 2013. This application claims priority to Japanese Patent Application No. 2012-014597, filed on Jan. 26, 2012. The entire disclosure of Japanese Patent Application No. 2012-014597 is hereby incorporated herein by reference.

BACKGROUND

1. Field of the Invention

The present invention relates to a management system of a hybrid vehicle, a control method for the hybrid vehicle and a control apparatus for the hybrid vehicle.

2. Background Information

It has been known that, in an engine stop control apparatus for a hybrid vehicle comprising an engine and a motor for driving and generating electricity, a drive mode select unit is provided, and, when the requested driving force is equal to an engine stop determination value or less, an EV drive mode is selectively adopted, and the vehicle is driven only by the driving force of the motor. When the requested driving force is larger than the engine stop determination value, the vehicle is then driven in an HEV mode so as to be driven at least by the driving force of the engine. The engine stop control apparatus further comprises a deceleration determining unit for predicting/detecting the deceleration of the vehicle so that the drive mode select unit is configured, when switching to the EV mode from the HEV drive mode, to transition to the EV mode from the HEV mode after lapse of a delay time which is set in advance. Further, as the deceleration determined based on the deceleration determining unit decreases, the delay time will be set shorter (see Japanese Patent Application Publication No. 2009-234565).

SUMMARY

However, since the mode switches to the HEV drive mode when the requested driving force is larger than the engine stop determination value, regardless of the road conditions, there is a problem that the number of engine start-up increases and the fuel consumption deteriorates.

The object the present invention resides in providing a management system for a hybrid vehicle, a control apparatus for the hybrid vehicle, and a control method for the hybrid vehicle, wherein the number of engine startups are inhibited or suppressed and the fuel economy will be improved.

According to the present invention, the problem described above is solved by acquiring from a plurality of vehicles engine operating information with respect to a travelling or moving distance or an engine operating time from the start of to the stop of an engine during the operation of a motor/generator and an engine operating position indicative of the point at which the engine is operating, and by identifying an engine start-up suppressing area for suppressing the engine start-up on map data based on the engine operating information.

According to the present invention, in many hybrid vehicles, the positions at which the engine is easily and unnecessarily operated such as where the moving distance of vehicle with the engine running or operating is short or the engine operating time is short, etc., are identified and the engine start will be suppressed at these positions. Consequently, the number of engine start will be suppressed and the fuel economy will be improved.

BRIEF DESCRIPTION OF THE DRAWINGS

Referring now to the attached drawings which form a part of this original disclosure.

DETAILED DESCRIPTION OF THE EMBODIMENTS

Selected embodiments of the present invention will now be explained with reference to the drawings.

First Embodiment

Figure 1:
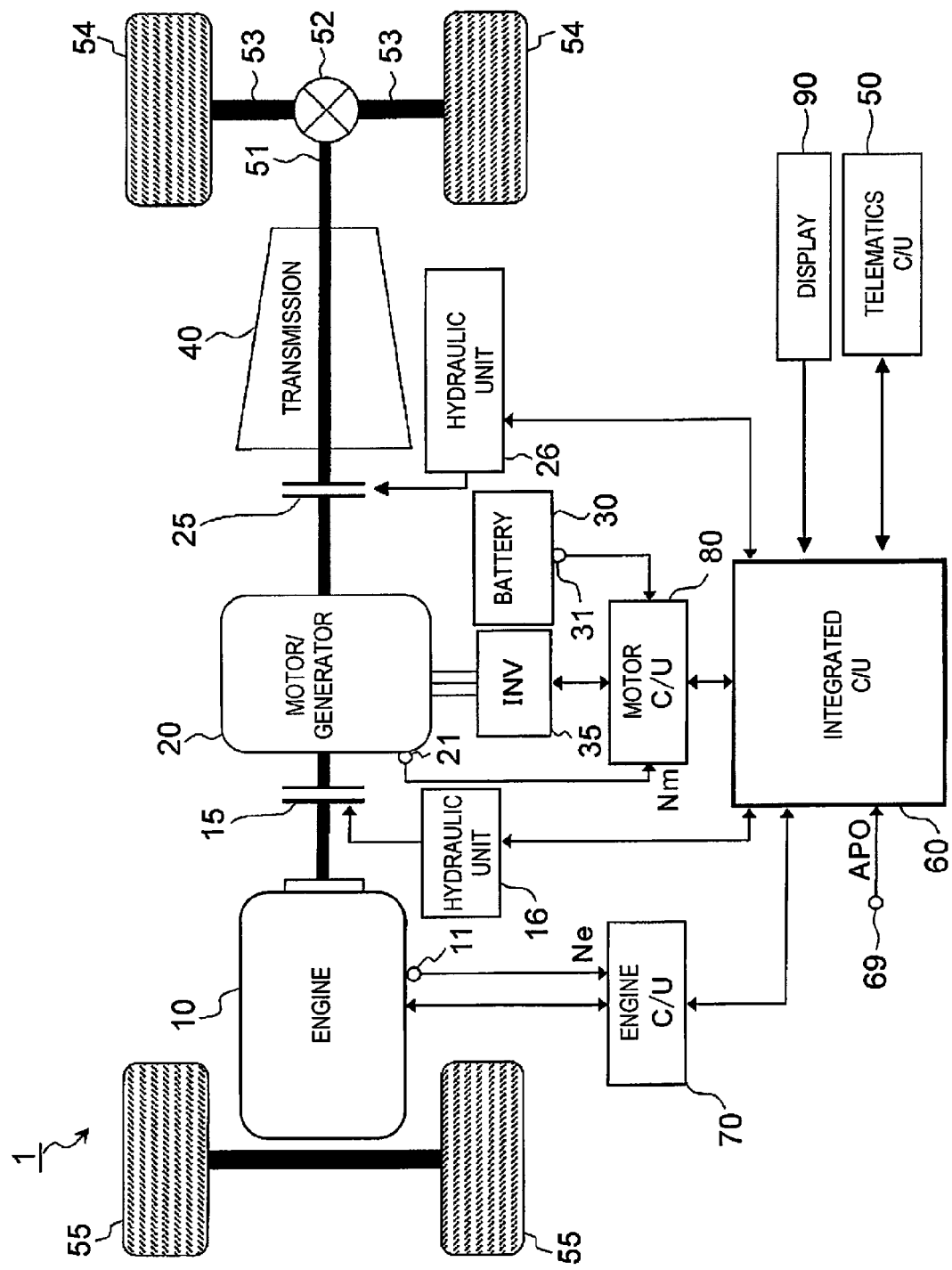
FIG. 1 is a block diagram pertaining to a hybrid vehicle according to the present exemplary embodiment.

The hybrid vehicle 1 of the embodiment according to the present invention is a vehicle of parallel system using a plurality of power sources for propulsion of the vehicle. As shown in FIG. 1. the hybrid vehicle 1 is provided with an internal combustion engine 10 (hereinafter referred to as "engine"), first clutch 15, motor/generator 20 (motor and generator), second clutch 25, battery 30, inverter 35, automatic transmission 40, propeller shaft 51, differential gear unit 52, drive shaft 53, left and right driving wheels 54 and a display 90. Hereinafter, although the present invention will be described as applied to a hybrid vehicle of parallel type, the present invention is also applicable to a hybrid vehicle of other systems. Further, instead of the automatic transmission 40, a continuously variable transmission (CVT) may also be used.

The engine 10 is an internal combustion engine driven by gasoline or diesel fuel, etc., and a valve openness of throttle valve, fuel injection amount, ignition timing, etc. are under control based on a control signal from the engine control module or unit 70.

The first clutch 15 is interposed between the output shaft of the engine 10 and the rotating shaft of the motor/generator 20, and is thus selectively connected and disconnected for torque transmission between the engine 10 and the motor/generator 20. As an example of the first clutch 15, a multiple-plate wet clutch may be enumerated for continuously controlling a hydraulic flow rate and a hydraulic pressure by way of a linear solenoid.

The first clutch 15 is controlled based on the control signal from unified or integrated control unit 60, and the clutch plates will be engaged (including engagement under a slipped state) or released.

A motor generator 20 is a synchronous motor generator in which a permanent magnet is embedded in a rotor and a stator coil is wound around a stator. The motor-generator 20 is provided with a motor rotation speed sensor 21 to detect a rotor rotation speed Nm. This motor/generator 20 functions not only as an electric motor but also as a generator. When supplied with a three phase alternate power from the inverter 35, the motor/generator 20 is driven to rotate (drive mode). On the other hand, when the rotor rotates by an external force, the motor/generator 20 produces AC power by causing an electromotive force at both ends of the stator coils (regeneration). The AC power generated by the motor generator 20 is charged to the battery 30 after being converted to a direct current by the inverter 35.

Examples of battery 30 are lithium ion secondary battery or nickel-hydrogen secondary battery. A current/voltage sensor 31 is attached to the battery 30 and these detection outputs are output to the motor control unit 80.

The automatic transmission 40 has a multiple-step transmission with speed ratios such as seven forward and one reverse speed ratios, which are subject to switch or change automatically depending on vehicle speed, accelerator pedal opening, etc. This automatic transmission 40 may change speed ratios in accordance with control signal from the unified control unit 60. The output shaft of automatic transmission 40 is coupled to left and right drive wheels 54 via differential gear unit 52, left and right drive shafts 53. Note that reference "55" denotes steered front wheels.

The telematics control unit 501 is provided with a communication device for transmitting and receiving with the external and communicates with a server described below. Further, the telematics control unit 50 is connected via a CAN communication with the integrated control unit 60.

A display 90 is configured to provide a display device for displaying information or the like which is managed by the navigation system in the integrated control unit 60 for notifying the occupant information.

In the hybrid vehicle 1 in the present embodiment, three drive modes are available to be switched depending on the engagement/release states of the first and second clutches 15, 25.

The first drive mode is an electric motor drive mode (hereinafter called "EV mode"), which is achieved by releasing the first clutch 15 and engaging second clutch 25 such that vehicle is propelled by the motor/generator 20 as the only power source for driving the vehicle.

The second drive mode is an engine-employing drive mode (hereinafter called "HEV mode"), which is achieved by engaging both the first clutch 15 and second clutch 25 such that the vehicle travels by engine 10 in addition to motor/generator 20 as the power source The third drive mode pertains to a slip drive mode (hereinafter called "WSC drive mode") which is achieved by maintaining second clutch 25 in a slipped state and vehicle is propelled by at least one of engine 1 and motor/generator 20 as the power source. This WSC drive mode is in place to achieve a creep travel especially when the SOC (the amount of charge, State of Charge) is low at a low temperature of engine cooling water and the like.

Note that, when making the transition to the HEV drive mode from the EV drive mode, by engaging the first clutch 15, which has been released, the engine 10 will be started using the torque of the motor generator 20.

Moreover, the HEV mode further includes three drive modes such as an "engine drive mode", a "motor assist drive mode", and a "power generating travel mode.

In the "engine drive mode", the engine 10 serves as the sole power source for propelling the drive wheels 54. In the "motor assist drive mode", both the engine 10 and the motor/generator 20 serve as power sources for propelling the drive wheels 54. In the "power generating travel mode", the engine 10 drives the drive wheels 54 while the motor/generator 20 functions as an electric generator Note that, in addition to the modes described above, a power generation mode may be eventually available in a vehicle stopped state where the motor/generator 20 is allowed to function as a generator by making use of the power of engine 10 to charge battery 30 or supplying power to an electric equipment.

The control apparatus of the hybrid vehicle 1 in the present embodiment is provided with a unified control unit 60, an engine control module or unit 70, and a motor control unit 80 as shown in FIG. 1. These control units 60, 70, 80 are interconnected to each other through a CAN communication line, for example The engine control unit 70 outputs, in accordance with a target engine torque command tTe from the unified or integrated control unit 60, a command controlling an engine operation point (engine rotation speed Ne, engine torque Te) to a throttle valve actuator, injector, spark plug and the like provided with engine 10. The information about engine rotation speed Ne, engine torque Te, is supplied to the integrated control unit 60 through the CAN communication line.

The motor control unit 80 is configured to receive information from the motor rotation sensor 21 equipped on motor/generator 20, and, in accordance with command such as a target mortar/generator torque tTm, outputs a command controlling the operation point of motor/generator 20 (motor rotation speed Nm, motor torque Tm) to inverter 35.

The motor control unit 80 is configured to calculate and manage the state of charge (SOC) of the battery 30 based on the current value and voltage detected by the current/voltage sensor 31. This battery SOC information is used for control information of the motor/generator 20, and sent to unified or integrated control unit 60 via CAN communication line.

The unified or integrated control unit 60 bears the function of driving or operating the hybrid vehicle 1 efficiently by controlling the operation point of the power train consisting the engine 10, the motor/generator 20, the automatic transmission 40, the first clutch 15, and the second clutch 25.

The integrated control unit 60 calculates the operation point of the power train based on the information from each sensor acquired through CAN communication, and executes to control the operation of the engine by the control command to the engine control unit 70, the operation of the motor/generator 20 by the control command to the motor control unit 80, the operation of the automatic transmission 40 through the control command to the automatic transmission 40, the engagement/release operation of the first clutch 15 by the control command to the hydraulic unit 16 of the first clutch 15, and the engagement/release operation of the second clutch 25 by the control command to the hydraulic unit 26 of the second clutch 25.

Figure 2:
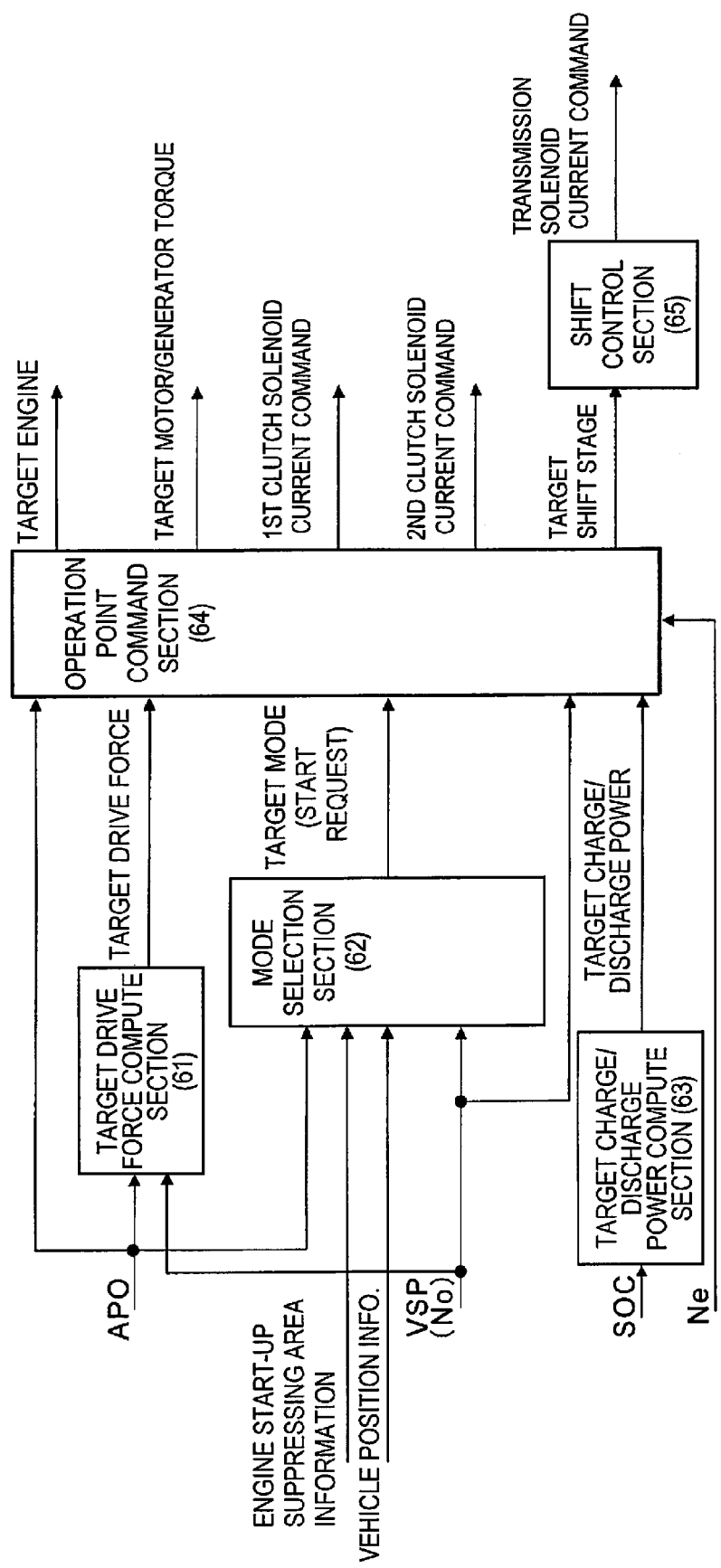
FIG. 2 is a block diagram of an integrated control unit in FIG. 1.

Now a description is made of drive controls of the engine 10 and the motor/generator 20 out of various controls to be executed by the integrated control unit 60. FIG. 2 represents a control block diagram of integrated control unit 60.

The integrated control unit 60 includes, as shown in FIG. 2, a target drive force computing section 61, a mode selecting section 62, a target charge/discharge computing unit 63, an operation point command section 64, and a shift control section 65.

Figure 3:
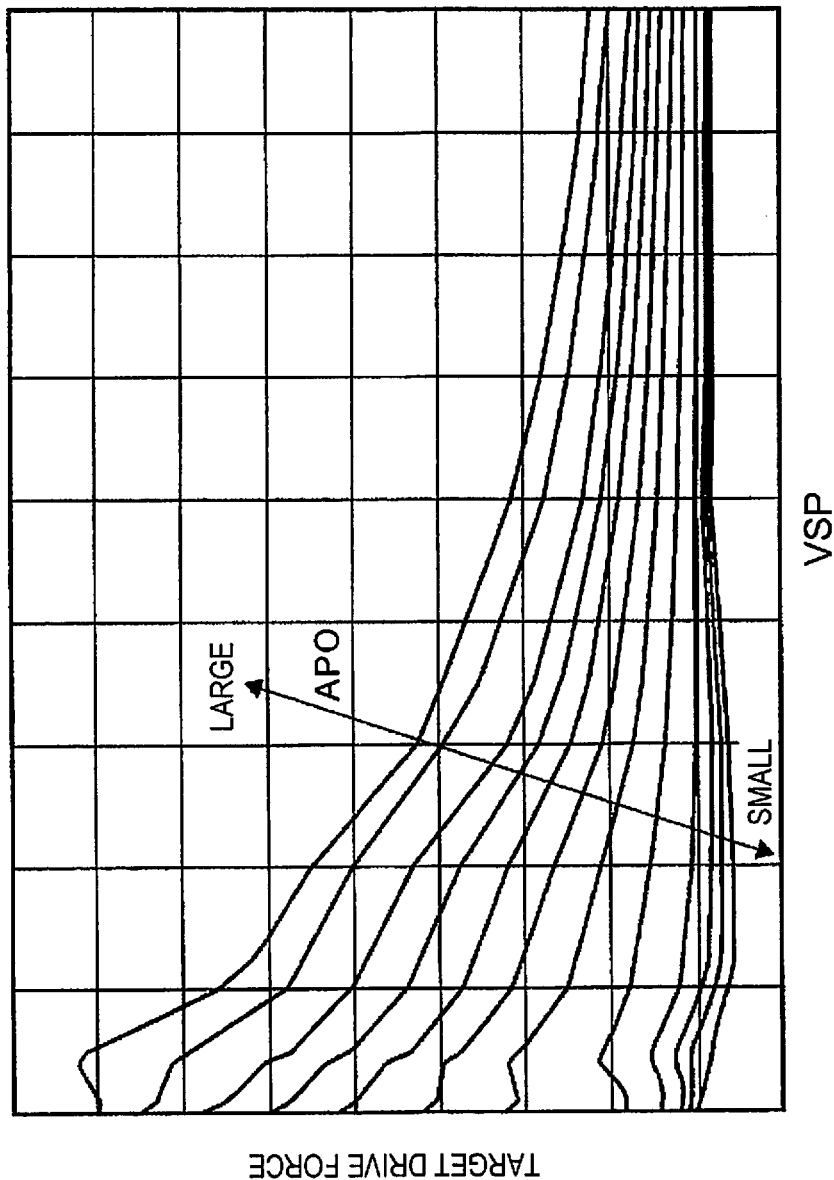
FIG. 3 is a graph showing the characteristics of the target driving force with respect to a vehicle speed in a target driving force computing section in FIG. 2.

The target drive force computing section 61 is configured to use the target driving force or torque map to compute a target driving force tFo0 based on the accelerator pedal opening APO detected by an accelerator opening sensor 69 and a transmission output rotation speed No (i.e., vehicle speed VSP) detected by the output rotation sensor 42 of the automatic transmission 40. An example of the target drive force map is shown in FIG. 3

Figure 4:
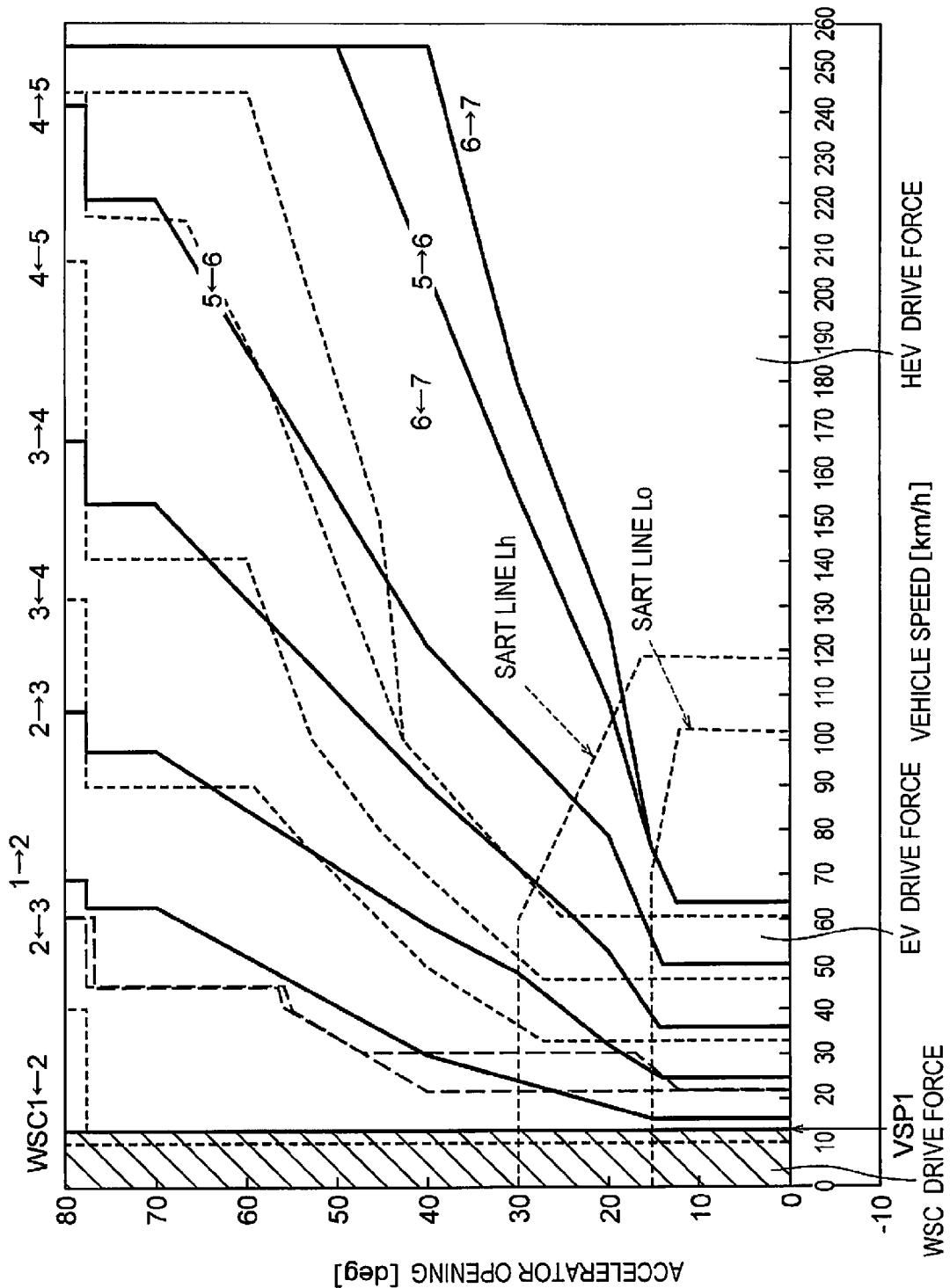
FIG. 4 is a graph showing a map of the drive modes with respect to the accelerator opening and vehicle speed in the mode select unit in FIG. 2.

Referring to the mode map, the mode select unit 62 selects a target mode. FIG. 4 shows an example of the mode map. In the mode map (shift map) in FIG. 4, depending on the vehicle speed VSP and accelerator opening APO, the regions for an EV drive mode, WSC drive mode and HEV drive mode are defined, respectively.

In this mode map, there are two engine start lines Lo and Lh. When the start line Lo is adopted as the engine start line, the EV mode is assigned to the inside of the engine start line Lo while the HEV drive mode is assigned to the outside of the engine start line Lo. Therefore, when transitioning or shifting from the EV drive mode to the HEV mode beyond the start line Lo, the mode select unit 62 requires starting the engine 10 toward the operation point command section 64. Similarly, with respect to the engine start line Lh, the EV mode is assigned to the inside of the engine start line Lh while the HEV drive mode is assigned to the outside of the engine start line Lh.

The engine start line Lo or Lh represents a threshold value for starting the engine 10. When the vehicle speed VSP and accelerator opening APO are greater than the threshold, the engine 10 is started.

The engine start line Lo is a reference start line, and during the normal running or drive, the mode select unit 62 set the engine start line to Lo and selects the drive mode.

Based on an engine startup suppressing area information sent from the server and the position information of own, hybrid vehicle, the threshold value to start the engine 10 will be set by changing the position of the engine start line on the mode map shown in FIG. 4. In addition, the control of the engine start line by the integrated control unit 60 will be described below.

Further, the WSC drive mode described above is assigned respectively to the low-speed region in both the EV drive mode and the HEV drive mode (region at 15 km/h or less, for example). The predetermined vehicle speed VSP1 that defines the WSC drive mode is configured to ensure the vehicle engine 10 to rotate autonomously or sustainably. Therefore, in the region lower than the predetermined vehicle speed VSP1, it is not possible to rotate engine 10 autonomously with the second clutch 25 being engaged.

Even if the EV drive mode is selected, when the SOC of the battery 30 is a predetermined value or less, a transition to the HEV drive mode may be effected forcibly.

The target charge/discharge computing unit 63 computes a target charge/discharge power tP based on SOC of battery 30 by using a previously defined target charge/discharge amount map.

The operation point command section 64 calculates, based on the accelerator pedal opening (APO), the target driving force tFo0, the target mode, the vehicle speed VSP, the target charge/discharge power tP, as a target operation point of the power train, a transient target engine torque tTe, a target motor/generator torque tTm (target motor/torque generator torque tNM may also be used), a target first clutch transmission toque capacity tTc1, a target second clutch transmission torque capacity tTc2, and a target speed ratio of automatic transmission 40.

The target engine torque tTe is sent to the engine control unit 70 from the integrated control unit 60, and the target motor generator torque tTm (or the target/motor generator rotation speed tNm) is sent to the motor control unit 80 from the integrated control unit 60.

The operation point command unit or section 64 calculates both target first clutch torque transfer capacity tTc1 and the second clutch torque transfer capacity tTc2 under the target mode set by the mode select unit 62, in order to generate the target driving force. In order to achieve the target first clutch torque transfer capacity tTc1 and the target second clutch torque transfer capacity tTc2, integrated control unit 60 sends solenoid current to each of the hydraulic unit 16 and 26, corresponding to the target first clutch torque transfer capacity tTc1 and target second clutch torque transfer capacity tTc2, respectively.

Further, the operation point command section 64 may allow engine 10 to start as a request on the system, regardless of the selected mode by mode select unit 62, when SOC (charge amount: State of Charge) is decreased and the like. For example, even if the mode select unit 62 selects EV mode, when the SOC of battery is low and the target charge/discharge computing unit 63 computing a target charge power to charge battery 30, then operation point command section 64 calculates a target calculation torque to start up engine 10 via engine control module 70.

The shift control unit 65 drives and controls a solenoid valve in the automatic transmission 40 so as to achieve the target shift stage along a shift schedule shown in a shift map. Note that the shift map used at this time is such that the target gear position is set in advance based on the accelerator opening APO and the vehicle speed VSP as shown in FIG. 4.

Figure 5:
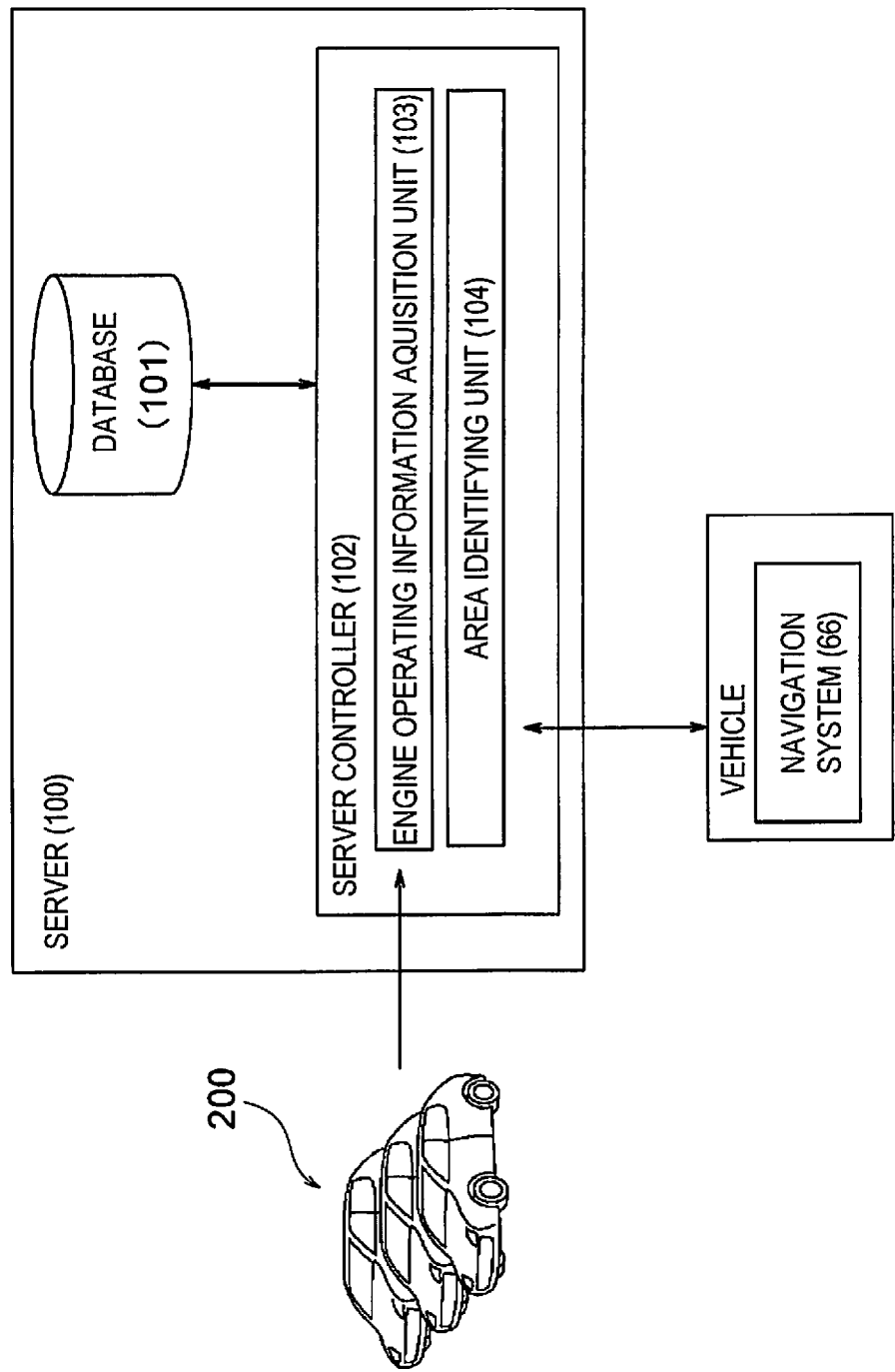
FIG. 5 is a block diagram of a hybrid vehicle and a server.

Now a description is given of the configuration and the control of the server that communicates with the hybrid vehicle 100. FIG. 5 shows a block diagram of the hybrid vehicle 1, a plurality of vehicles 200, and the server.

As shown in FIG. 5, the server communicates with both the hybrid vehicle and the other, plural vehicles 200 and acquires the vehicle information of each vehicle. The server 100 is provided with database 101 and a server controller 102. The database 101 sores the information of each vehicle received by the server 100. Further, when the server 100 may communicate with the other information providing agencies such as JMA by wired or wireless transmission, the database 101 stores the information from that information providing agency such as the weather information including pressure or temperature. Furthermore, the administrator of the server 100 may update the data stored in the database 101 (such as map data, for example).

The server controller 102 represents a controller for controlling the entire server 100 and includes an engine operating information acquisition unit 103 and an area specifying unit 104. The server controller 102 acquires or obtains the information transmitted from the vehicle and the vehicles 200 and analyzes the information to store in the database 101. Further, responsive to the requests of each vehicle 1, 200, the information stored in the database 101 will be broadcast to each vehicle 1, 200.

The engine operating information acquisition unit 103 acquires the engine operating information transmitted from the vehicle 1 and the vehicle 200. The area specifying unit 104 specifies on the map data an engine start-up suppressing area to prevent the starting of the engine on the basis of the engine operating information obtained by the engine operating information acquisition unit 103. Similar to the hybrid vehicle 1, the vehicles 200 are also a hybrid vehicle.

Here, the engine operating information is described together with the control of the vehicle 1. As described above, the vehicle 1 repeats the start and stop of the engine 10 through the transitions between the EV mode and the HEV mode in response to the accelerator opening and the vehicle speed. Also, upon the system requirements such as reduction in the SOC of the battery 30, the engine 10 is started. That is, during running, the vehicle 1, 200 are repeated to start the engine 30 at various positions in the map data.

Further, for example, when the vehicle travels the location with a steep inclined surface or heavy steps, the accelerator opening may be increased in response to the driver's depression on the accelerator pedal to increase the driving force to start the engine 30. Furthermore, when the road of these locations is short, the period during which the engine 30 is running is shortened so that the mode reverts back to the original EV mode in a short period of time. That is, in the hybrid vehicle, in the specific road conditions, even if traveling in EV mode is possible, depending on the accelerator operation of the driver, the engine will be started and the mode may transition to the HEV mode. Further, such a start of the engine is likely to occur in the specific road conditions with respect to many hybrid vehicles.

In the present embodiment, in a viewpoint different from the demand on the system, dependent upon the specific road conditions, the areas (corresponding to engine start-up suppressing area) are identified by the server 100 where many vehicle perform the engine start for a short period of time (or for a short distance). Further, in order to identify these areas, the vehicle 1, 200 transmit the engine operating information to the server 100.

The engine operating information is such information for identifying by the server 100 the engine start-up suppressing area, and is transmitted from each vehicle 1, 200 to the server 100. The engine operating information contains an operating position indicative of the point at which the engine operates during the operation of the motor/generator 20, the moving distance of the vehicle 1 during the engine operation, and the accelerator pedal opening at the startup of the engine 10.

The information in the engine operating position contains the position at the startup of the engine 10 and the position during the engine operating after the engine start-up. This position or location information is displayed in the coordinates of map data. In the server 100, the information on the operating position of the engine 10 is used to manage, in the map data, the position where the engine 30 of each vehicle 1, 200 is started.

The information of the moving distance of the vehicle 1, 200 during the operation of the engine 10 corresponds to the distance the vehicle 1, 200 has travelled. The information of the moving distance is used for the server 100 to determine whether or not the start of the engine 10 has been performed, depending on the specific conditions, in a short distance.

The accelerator opening at the time of starting the engine 10 is used for the server 100 to determine whether the starting of the engine 10 is performed by an accelerator operation by the driver or performed in response to the system requirements. That is, while the accelerator opening degree is low, when the engine 10 is started, since the possibility that the engine 10 is operated in response to the system requirements is high, the server 100 uses the accelerator pedal opening to identify such engine start-ups.

The integrated control unit 60 acquires, when the vehicle 1 transitions between the EV mode and the HEV mode, the information of these and stores in a memory not shown. When the EV mode transitions to the HEV mode, the integrated controller 60 acquires the accelerator opening at the time of engine start-up as well as the vehicle position. The accelerator opening is obtained from a detection value of the accelerator opening sensor 69. Since the navigation system contained in the integrated control unit 60 grasps the current position of the vehicle, the vehicle position at the time of drive mode transition may be retrieved from the information that is managed by a navigation system 66.

Further, the integrated controller 60, when a transition is made to the EV mode from the HEV mode, obtains the accelerator opening and the vehicle position at the time of engine stop. Further, based on the position of the vehicle 1 at the time of engine start-up and the position of the vehicle 1 at the time of engine stop, the integrated controller 60 may grasps the moving distance of the vehicle 1 during the operation of the engine 1.

As described above, the integrated controller 60 stores in memory the engine operating information obtained during the travel of the vehicle 1. The integrated control unit 60 transmits the engine operating information stored in the memory to the server 100 when a main switch (not shown) of the vehicle has been turned on or the main switch has been turned off. With respect to the other vehicles 200, the engine operating information is similarly acquired and the engine operating information is transmitted to the server 100. Thus, the server 100 acquires the engine operating information of a plurality of vehicles 1, 200.

Now, a description is given of the engine start-up suppressing area together with the control of the server 100. The engine start-up suppressing area denotes an area the engine 10 is unnecessarily started, depending on the road conditions, by an increased amount of the accelerator pedal of the driver with a large accelerator opening. Further, in order for the vehicle 1, 200 to control such that the engine is less likely to be started by the accelerator operation of the driver in these areas, the server 100 identifies the engine control area and transmits the area information to each vehicle 1, 200.

First, the server controller 102 acquires the engine operating information from each vehicle 1, 200 by the engine operating information acquisition unit 103, and stores the engine operating information in the data base in correspondence with the map data managed by the database.

Specifically, the server controller 102 determines, based on the accelerator opening contained in the engine operating information whether the start of the engine 10 indicated by the engine operating information is due to that caused by the system requirement or a driving request associated with the accelerator operation of the driver. In the server controller 102, the threshold value of the accelerator pedal opening is set in advance, according to which the determination is made on whether or not the start involved is system initiated or necessitated.

Then, when the accelerator opening exceeds the accelerator opening threshold, the server controller 102 determines that the startup of the engine has been the engine start due to the request for drive as indicated by the engine operating information. On the other hand, the server controller 102 determines, when the accelerator opening is less than the accelerator opening threshold, that the start of the engine as indicated by the engine operating information is due to the engine start-up due to the system request.

In the case of the engine start-up due to the system request, the server controller 102 does not store the obtained engine operating information in the database 101.

Next, the server controller 102 determines, based on the moving distance during the engine operation, whether or not the start of the engine 10 indicated by the engine operating information unnecessary for running the vehicle. Note that the engine start-up that is not necessary for running or travel of the vehicle 1 corresponds to the condition in which the EV mode may be maintained as the running or travel condition without the engine being started.

The server controller 102 is provided in advance with a threshold distance to determine whether or not the unnecessary engine start-up is involved. Thus, when the moving distance during the engine operation is shorter than the threshold distance, the server controller 102 determines that the start of the engine 10 indicated by the engine operating information is that unnecessary for the travel of the vehicle because of a short engine operation and thus unnecessary engine operation. On the other hand, when the moving distance during the engine operation is longer than the threshold distance, the server controller 102 determines for the engine start that is necessary for travel of the vehicle 1. In the case of the engine start required for the running of the vehicle, the server controller 102 will not store in the database 101 the engine operating information obtained.

Figure 6:
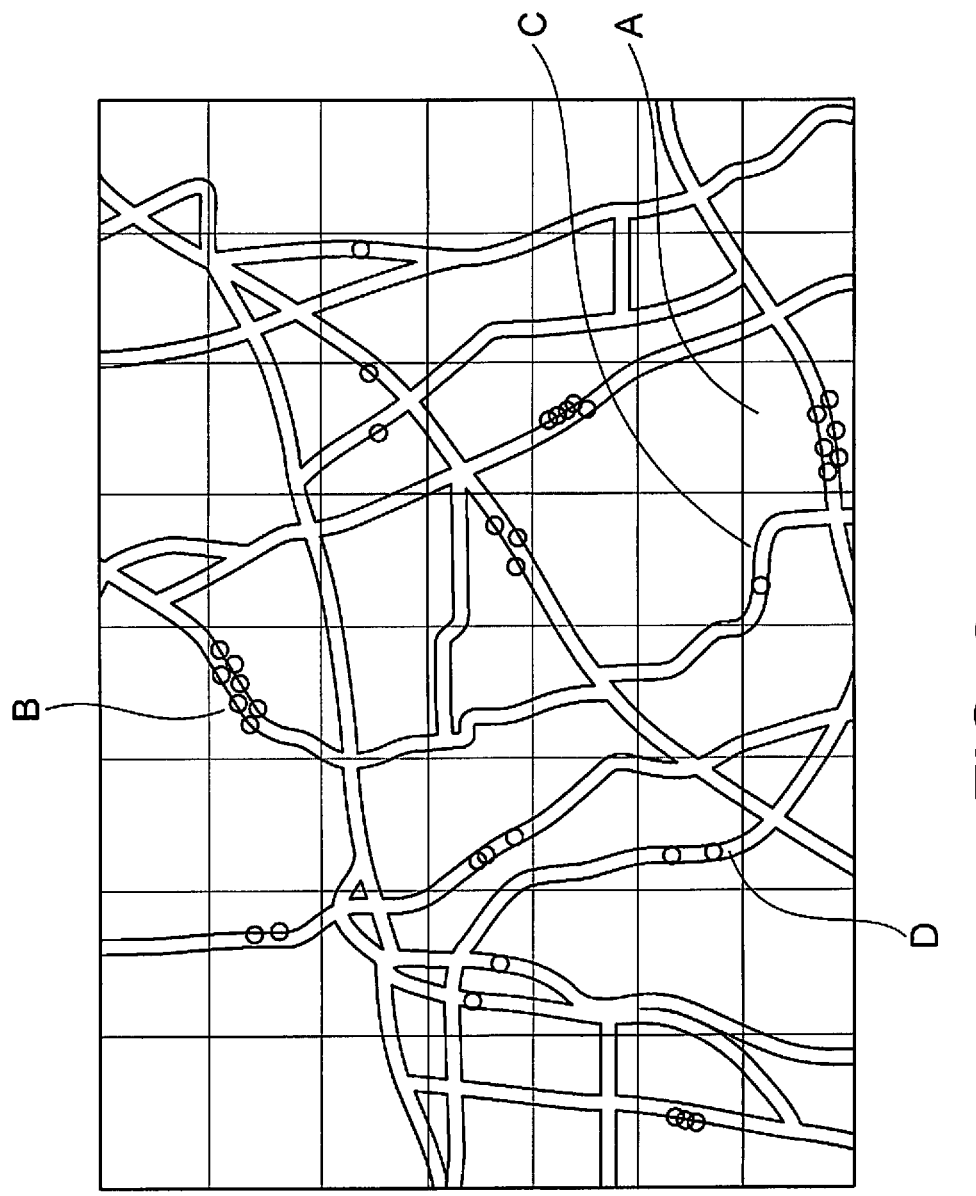
FIG. 6 is a conceptual diagram for explaining map data and engine operating information managed by the server.

Based on these determinations, the server controller 102 identifies the engine start that is necessitated by the request for driving force and thus not necessary for the running or travel of the vehicle, and plots the engine operating information to the operating position of the engine 10 contained in the engine operating information in the map data of the database 101. FIG. 6 shows the map data stored in the database 101 and the engine operating information to be plotted on the map data. In FIG. 6, a frame which is surrounded by latitude and meridian shows a mesh, and a white circle represents an engine operating information.

In order to manage the number of engine operating information in each area on the map data, the server controller 102 employs meshes as shown in FIG. 6. The mesh is obtained by dividing equally a predetermined area defined by a meridian constant. The size of the mesh is determined in advance.

The server controller 102 plots the engine operating information by a point at a position in the mesh corresponding to the position of the engine operating information that has been identified through the determination described above. The plot is made with respect to the position of the engine start out of the positions during the engine operating information. The server controller 102 performs the similar determination and plotting of the information with respect to plural vehicles 200. Thus, a great deal of the engine operating information will be plotted in the map data of the database 101. Further, the server controller 102 deletes the engine operating information with respect to which a predetermined time has elapsed. Thus, the information being plotted on the map data represents the information that is frequently updated and plotted within a predetermined time period.

Then, the server controller 102 manages by the area identifying unit 104 the number of the engine operating information for each mesh on the map data to be stored on the database 101. For example, in the mesh A shown in FIG. 6, six pieces of engine operating information are plotted, in the mesh B, seven pieces of engine operating information are plotted, in the mesh C, a single piece of engine operating information is plotted, and in the mesh D, two pieces of the engine operating information are plotted. In other words, in the mesh A, the total of six vehicles starts the engine with a constant period.

For each mesh, the area identifying unit 104 compares the number of engine operating information of each mesh with an area specific threshold. The area specific threshold is a preset threshold set to specify that a plurality of vehicles have performed an unnecessary engine start on a road travelled in the mesh. Further, the area identifying unit 104 identifies a mesh as the engine start-up suppressing area when the number of engine operating information within the mesh exceeds the area specific threshold. For example, if the area specific threshold value is set to five, the meshes A and B are specified or identified as the engine start-up suppressing area whereas the meshes C and D will not be identified as the engine start-up suppressing area.

That is, in the mesh A and the mesh B, the engine startups are performed in a short time period due to the request for driving force by the driver in many vehicles. Since this engine start-up is considered as an unnecessary engine startup for running or travelling the roads in the meshes A, and B, the meshes A, B are identified as the engine start-up suppressing area.

Once the engine start-up suppressing area has been identified by the area identifying unit 104, the server controller 102 transmits the information containing the engine start-up suppressing areas in response to a request from the vehicle 1.

Next, returning to FIGS. 1, 2, and 4, a description is given of the control of the engine start line based on the engine start-up suppressing areas.

When turning on the main switch, the integrated control unit 60 communicates through the Telematics control unit 50 with the server 100, and transmits to the server 100 a signal indicating to acquire the engine start-up suppressing area information.

After acquiring the engine start-up suppressing area information, the integrated control unit 60 stores that information in a memory (not shown). The integrated control unit 60 determines whether the engine start-p suppressing area is included in the travelled road extension of the vehicle 1, the vehicle is approaching the engine start-p suppressing area, and the vehicle 1 is travelling in the engine start-up suppressing area. For the purpose of this determination, the integrated control unit 60 measures a distance between the current position of the vehicle 1 managed by the navigation system 66 and the position of entry into the engine start-up suppressing area ahead of the travelling road (which corresponds to the crossing point of the travelling road and the mesh boundary corresponding to the area). Further, the integrated control unit 60 compares the measured distance to the threshold distance set in advance. When the measured distance is shorter than the threshold distance previously set, it is determined that the vehicle is close to the engine start-up suppressing areas.

When it is determined that the vehicle is close to the engine start-up suppressing area, the integrated control unit 60 informs the occupant that the vehicle has approached the engine startup suppressing area by displaying the engine start-up suppressing areas on the map data.

Further, when it is determined that the vehicle approaches the engine start suppressing or inhibition area, the integrated control unit 60 causes the mode select unit 62 to set the engine start line on the map shown in FIG. 4 to the engine start line Lh that is higher than the reference engine start line Lo so that the threshold to start the engine will be higher than the reference value.

As shown in FIG. 4, the engine start line Lh is drawn to a position higher than the engine start line Lo. Therefore, when the engine start line is set to Lh, as compared with the case where the engine start line is set to Lo, the region of EV drive mode is widened while the area of the HEV drive mode is narrower. That is, when set to the engine start line Lh, the vehicle speed or the accelerator position or opening for starting the engine 10 will be higher compared with the case where set to Lo so that the engine start will be suppressed or inhibited.

Similarly, when the position of the vehicle 1 is located in the engine start-up suppressing area, the integrated control unit 60 causes the mode select unit 62 to set the engine start line on the map shown in FIG. 4 to the engine start line Lh that is higher than the reference engine start line Lo. Thus, even when the vehicle 1 is travelling in the engine start suppressing area, the engine start line is maintained to adopt the engine start line Lh so that the engine start will be suppressed or inhibited.

By using the map data shown in FIG. 6, the control of the engine start line based on the engine start suppressing area in the present embodiment will be described. It is assumed that the vehicle 1 travels from the road in the mesh C to the road in the mesh A. While the vehicle 1 is travelling the road in the mesh C, since the area in the mesh C does not correspond to the engine startup suppressing area, the engine start line is set to the reference start line Lo.

When the vehicle approaches the road in the mesh A from the travelling state in the mesh C in the EV mode, the integrated control unit 60 identifies that the vehicle 1 approaches the engine start suppressing area and causes the mode select unit 62 to the engine start line to Lh. Further, even if the driver of the vehicle 1 depresses the accelerator pedal during the travel on the road in the mesh C while viewing the road condition in the mesh C, the engine 10 will not be started since the engine start line has been set to the higher start line Lh. Thus, the engine 10 does not start and the vehicle 1 maintains the EV drive mode to pass the road in the mesh C. Thus, the engine start of the vehicle 1 will be suppressed in the engine start suppressing area. Then, when the vehicle 1 leaves the area of the mesh A, the mode select unit 62 returns the engine start line to the start line Lo.

Figure 7:
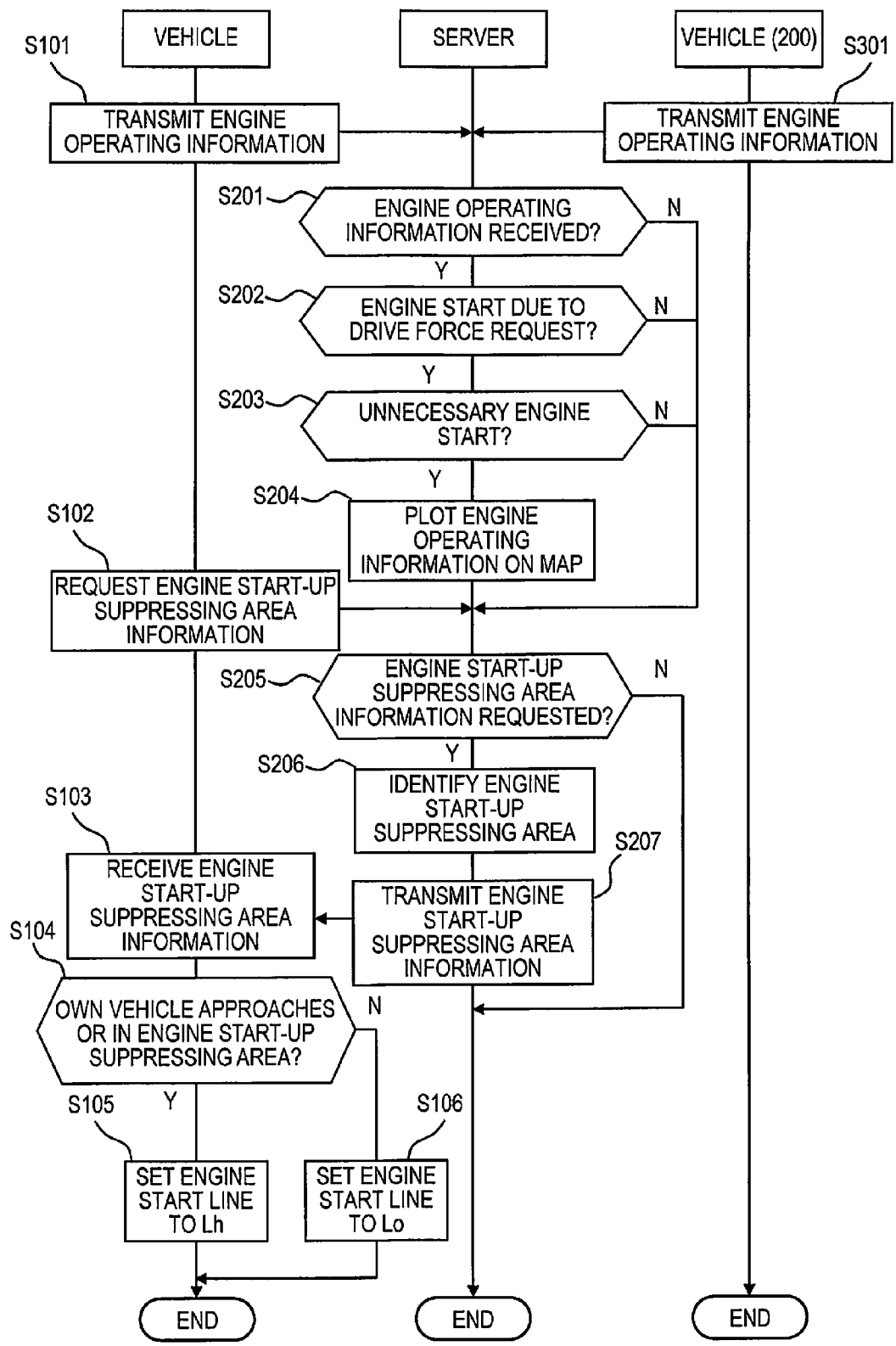
FIG. 7 is a flow chart of a control procedure.

Now, with reference to FIG. 7, a description is given of a control procedure of the control apparatus for a hybrid vehicle according to the present embodiment by the vehicles 1, 200 and the server 100. FIG. 7 shows the control procedure of the vehicles 1, 200 and a flowchart of the control procedure of the server 100. Among the control flows shown in FIG. 7, the controls represented by steps S104 to S106 are repeatedly carried out at a predetermined cycle.

In step S101, the integrated control unit 60 of the vehicle 1 transmits the engine operating information to the server 100. Also, in step S301, the integrated control unit 60 of the vehicle 200 transmits the engine the engine operating information to the server 100.

After sending the engine operating information to the server 100 by the vehicle 1 and the vehicle 200, a transition is made to the control on the side of the server 100. In step S201, the server controller 102 determines whether or not the engine operating information acquisition unit 103 has received the engine operating information from the vehicles 1, 200. When not received, control proceeds to step S205.

When the engine operating information has been received, the server controller 102 uses the accelerator opening contained in the acquired engine operating information in step S202 to determine whether or not the engine start is due to a request for driving force. When the accelerator opening is less than the accelerator opening threshold value, the server controller 102 determines not to be the engine start due to the request for driving force, and control proceeds to step S205. On the other hand, when the accelerator opening is equal to or greater than the accelerator opening threshold, the server controller 102 determines for the engine start necessitated by the driving request and control proceeds to step S203.

In step S203, based on the information of the position at the start of the engine and at the time of operation stop contained in the acquired engine operating information, the server controller 102 measures the moving distance of the vehicles 1, 200 from the engine start to the engine stop, and, using the moving distance, determines whether or not the engine start has been unnecessary. When the measured moving distance is longer than the threshold distance, the server controller 102 determines for the necessary engine start and control proceeds to step S205. On the other hand, when the moving distance is equal to the threshold distance or more, the server controller 102 the engine start to be unnecessary and the control proceeds to step S 204.

In step S204, the server controller 102 plot the engine operating information on the map data managed by the database 102 while corresponding the information of the start of the engine 10 contained in the engine operating information identified in steps S202 and S203 to the position on the map data. Thus, the server 100 identifies the engine operating information pertaining to the engine start unnecessary for the travel of the vehicles 1, 200 and thus manages the engine operating information on the map data.

Returning to the control on the side of the vehicle 1, in step S102, the integrated control unit 60 transmits a signal for requesting for information on the engine start-up suppressing area to the server 100.

Returning to the control on the side of the server 100, in step S205, the server controller 102 determines whether or not the request signal for the engine start-up suppressing area has been received. If the request signal has not been received, the control process on the server-side will end.

In step S206, upon receiving the request signal of the area, the area identifying unit 104 respectively calculates, for each mesh assigned to the map data in the database 101, the number of the plotted engine operating information. Then, the area identifying unit 104 compares, for each mesh, the number of engine operating information calculated and an area identifying threshold. Then, the area identifying unit 104 identifies those areas that correspond to the mesh in which the number of the engine operating information is equal to the area identifying threshold or more as the engine start suppressing area.

In step S207, the server controller 102 transmits the information about the identified engine operating suppressing area to the vehicle 1 and terminates the control process on the side of the server.

Returning to the control on the side of the vehicle 1, the integrated control unit 60 receives a response signal responsive to the request signal for the area information in step S 102 and thus receives the information about the engine start suppressing area (step S 103). In step S104, the integrated control unit 60 uses the navigation system to determine whether or not the current position of the vehicle 1 approaches the engine start suppressing area. The integrated control unit 60 further determines whether or not the current position of the vehicle 1 is located within the engine start suppressing area.

When the current position of the vehicle 1 approaches the engine start-up suppressing area, or when the current position of the vehicle 1 is located in the engine start-up suppressing area, the mode select unit 62 sets in step S105 the engine start line to the higher start line Lh and ends the control on the side of the vehicle 1. On the other hand, when the current position of the vehicle 1 is not close to the engine start-up suppressing area, or when the current position of the vehicle 1 is not present in the engine start-up suppressing area, the mode select unit 62 sets the engine start line to the lower, reference start line Lo in step S106 and ends the control on the vehicle 1. Thus, even if the driver depresses upon the accelerator pedal while the vehicle 1 travels the engine start-up suppressing area, the engine start-up in the area will be suppressed or inhibited since the threshold for starting the engine is high.

As described above, the present invention comprises an engine operating information acquisition unit 103 that acquires, from a plurality of vehicles 1, 200, a moving distance from the start of the engine to the stop thereof during the operation of a motor/generator 20 and an engine operating position indicative of a point or the position at which the engine is operating and an area identifying unit 104 for identifying on map data an engine start-up suppressing area in which the engine is suppressed from being started based on the engine operating information. Further, the area identifying unit 104 identifies, based on the information of the moving distance acquired from the engine operating information acquisition unit 103, the engine operating information that contains a distance the engine is determined to cover by unnecessary operation, and further identifies the area that contains the operating position in the engine operating information thus identified as an engine start-up suppressing area. Thus, depending on the road conditions, etc., the area in which many unnecessary engine starts are performed may be grasped and the fuel economy may be improved by inhibiting the engine start in that area.

Further, in the present embodiment, based on an operating position of the engine in which the moving distance from start to stop of the engine 10 is equal to or less than a threshold distance, the engine start-up suppressing area is identified. In addition, the area identifying unit 104 identifies among the information about the moving distance acquired by the engine operating information acquisition unit 103 such engine operating information of the moving distance less than a threshold distance and further identifies the area that contains the operating position of the engine operating information thus identified as the engine start-up suppressing area. Thus, since the position or location in which it is not necessary for the engine 10 to be started may be identified, the fuel economy may be improved by suppressing or inhibiting the engine start in that area.

Further, in the present embodiment, the number of the engine operating information is managed on the map data, and, based on the number of the engine operating information; the engine start-up suppressing area is identified. Then, the area identifying unit 104 identifies, based on the number of the engine operating information managed on the map data, the area in which the engine operating information is concentrated and thus indicating that the engine is started unnecessarily as the engine start-up suppressing area. Thus, it is possible to identify the area in which many hybrid vehicles start the engine 10 unnecessarily, so that, by suppressing the engine start-up in the area, fuel efficiency may be improved.

Further, in the present embodiment, out of the areas corresponding to a plurality of meshes on the map data, the area in which the engine operating information is equal to or greater than an area threshold is identified as the engine start-up suppressing area. Thus, it is possible to identify the area in which many hybrid vehicles start the engine 10 unnecessarily, so that, by suppressing the engine start in the area, fuel efficiency may be improved.

Also, in the present embodiment, the engine operating information includes information indicating that the engine 10 is operating by a request of the driver operating the vehicle, and the area identifying unit 104 identifies the engine start-up suppressing area based on that information. Further, the area identifying unit 104 identifies, based on the information about the moving distance acquired by the engine operating information acquisition unit 103, the information indicating that the engine 10 is operated in response to a request due to a driving operation of the driver, and further identifies the area containing an operating position of the engine operating information thus identified as the engine start-up suppressing area. Thus, after excluding the information of the engine start due to the system request from the information for identifying the engine start-up suppressing area, it is possible to identify the area in which the engine 10 is unnecessarily started. Consequently, by suppressing the engine start-up in the area, it is possible to improve the fuel economy.

According to the present invention, the operating position of the engine 10 is set to a point where the engine 10 is started. Thus, it is possible to grasp the point at which, depending on the road conditions or the like, the engine start is frequently unnecessary performed.

Further, based on the position information of the vehicle 1 and the engine start-up suppressing area, the integrated control unit 60 of the hybrid vehicle 1 sets a start line to start the engine. Thus, in the engine start-up suppressing area, it is possible to suppress the engine start-up and to thereby improve the fuel economy.

The integrated control unit 60 pertaining to the present invention sets the start line L0, when the position of the vehicle 1 is located in the engine start-up suppressing area, higher than the start line that is in place when the position of the vehicle 1 is outside of the engine suppressing area. Accordingly, in the engine start-up suppressing area, the region of the HEV drive mode is narrowed and engine start is suppressed, it is possible to prevent unnecessary engine start to thereby improve the fuel economy.

The present invention notifies the occupant of the engine start-up suppressing area by a display 90. Thus, it is possible to check the area where the unnecessary engine start is often performed. Therefore, it is possible to suppress the depression amount of the accelerator pedal in the area to improve the fuel economy.

Note that, in the present embodiment, by including a moving or travel time of the vehicle 1 during the operation of the engine 10 in the engine operating information instead of the moving distance of the vehicle 1 during the operation of the engine and by determining whether or not the engine start has been performed, based on the specific road conditions, for a short period of time, the engine start-up suppressing area may be identified. Note that the control of the engine start-up suppressing area using the moving time of the vehicle 1 the engine operation information, in place of the movement distance of the vehicle 1 in the running of the engine 10, including the travel time of the vehicle 1 in the running of the engine 10, the use of the travel time, the present embodiment, the engine start There By determining as to whether or not made by the short road particular situation, it is possible to identify an engine start-up suppressing areas. Among the control of the control of the engine start-up suppressing areas with travel time of the vehicle 1 may be replaced by moving time for the moving distance.

Note that the plots shown in FIG. 6 were made in the positions at the start of the engine 10. However, these may be only at the time of stop. Alternatively, these may be both at the time of the start of the engine 10 and at the time of the stop of the engine 10.

With respect to the timing of transmission of the engine operating information to the server 100 from the vehicles 1, 200, the transmission may be made at a predetermined cycle, or at the time of engine start. Further, with respect to the timing of transmission of the information about the engine start suppressing area to the vehicle 1, the information may be sent at a predetermined period or at a predetermined time without relying on the request signal from the vehicle 1.

Note that, in the present embodiment, although the start-up identifying area is provided as the area divided by the mesh of FIG. 6. Alternatively, a predetermined scope with the point indicating the engine operating position contained in the mesh may be set as the engine start-up suppressing area. More specifically, in step S206, after identifying the area in which the number of the engine operating information exceeds the area identifying threshold, a predetermined scope (for example, a scope or range determined by a circle of a predetermined radius) having the plot indicative of the engine operating information included in the area as a center is identified as the engine start-up suppressing area. Thus, it is possible to identify the area in which many hybrid vehicles start the engine 10 unnecessarily so that the fuel economy may be improved by suppressing the engine start in that area.

Note that the central point that defines the predetermined scope may be any of a plurality of plots indicating the engine operating information contained in the mesh. Alternatively, since each point is managed by the coordinates on the map data, the mean position may be uses as the central point.

Further, in the present embodiment, the map id divided by meshes and the engine start-up suppressing area is identified thereby. However, instead of the mesh, in correspondence with the link information or node information on the map data, the map may be divided by a predetermined area.

Note that, in the present invention, the engine start-up suppressing area is notified by using a display 90. However, other notifying mechanism such as a speaker may be employed.

The engine operating information acquisition unit 103 described above corresponds to the acquisition unit according to the present invention, the area identifying unit 104 to the area identifying unit according to the present invention, the navigation system 66 to the management unit according to the present invention, and the telematics control unit 50 to the communication unit, and the mode select unit 62 to the control unit according to the present invention, respectively.

The invention claimed is:

1. A hybrid vehicle management system for managing one of a plurality of hybrid vehicles each having an engine and a motor/generator as power sources, the hybrid vehicle management system comprising:
a first controller programmed to acquire engine operating information from each of the plurality of hybrid vehicles, the engine operating information for each of the plurality of hybrid vehicles including at least one of a moving distance and an operating time of the engine from the start of the engine to the stop of the engine during operation of the motor/generator and an engine operating position indicative of a point at which the engine is operating,
the first controller being further programmed to identify on map data an engine start-up suppressing area for the one of the plurality of hybrid vehicles in which the engine of the one of the plurality of hybrid vehicles is to be suppressed from being started based on the engine operating information, the engine start-up suppressing area being a geographic area.

2. The hybrid vehicle management system as claimed in claim 1, wherein
the first controller is further programmed to identify the engine start-up suppressing area based on an engine operating position in which one of the moving distance and the operating time is equal to or below a predetermined value.

3. The hybrid vehicle management system as claimed in claim 1, wherein
the first controller is further programmed to manage a number of the engine operating information on the map data and identifies the engine start-up suppressing area based on the number of the engine operating information.

4. The hybrid vehicle management system as claimed in claim 3, wherein
the first controller is further programmed to identify, out of a plurality of areas on the map data, an area in which the number of the engine operating information is equal to or greater than a predetermined number as the engine start-up suppressing area.

5. The hybrid vehicle management system as claimed in claim 3, wherein
the first controller is further programmed to identify, out of a plurality of areas on the map data, a predetermined scope with the engine operating position included in the area in which the number of engine operating information is equal to or greater than a predetermined number as a central point, as the engine start-up suppressing area.

6. The hybrid vehicle management system as claimed in claim 1, wherein
the first controller is further programmed to acquire operating request information in response to a request for the operating request information, and identify the engine start-up suppressing area based on the operating request information acquired in response to the request,
the operating request information indicating that the engine of the one of the plurality of hybrid vehicles has been operated in response to a driving operation of the driver.

7. The hybrid vehicle management system as claimed in claim 6, wherein
the first controller is further programmed to acquire an accelerator pedal opening as part of the operating request information.

8. The hybrid vehicle management system as claimed in claim 1, wherein
the first controller is further programmed to acquire a point at which the engine of the one of the plurality of hybrid vehicles has been started as part of the engine operating position.

9. The hybrid vehicle management system as claimed in claim 1, further comprising:
a second controller programmed to manage vehicle position information of the one of the plurality of hybrid vehicles, and communicate with a management server provided with the first controller;
the second controller being further programmed to control the engine of the one of the plurality of hybrid vehicles by setting an engine start threshold to start the engine based on the vehicle position information of the one of the plurality of hybrid vehicles and the engine start-up suppressing area.

10. The hybrid vehicle management system as claimed in claim 9, further comprising:
a sensor configured to detect at least one of an accelerator opening and a vehicle speed, the second controller being further programmed to start the engine upon determining a detection value of the sensor is equal to or greater than the engine start-up threshold,
the vehicle position information including a vehicle position,
and the second controller being further programmed to set the engine start threshold to be higher when the vehicle position is within the engine start-up suppressing area than when the vehicle position is outside of the engine start-up suppressing area.

11. The hybrid vehicle management system as claimed in claim 9, further comprising a notifying unit for notifying the driver of the vehicle of the engine start-up suppressing area.

12. A hybrid vehicle management system for managing hybrid vehicles having an engine and a motor/generator as power sources, the hybrid vehicle management system comprising:
   a management server for managing position information of the vehicle;
   a controller programmed to transmit engine operating information to the management server and control the engine, the engine operating information including a moving distance or an operating time of the engine from the start of the engine to the stop of the engine during the operation of the motor/generator and an engine operation position indicative of the point at which the engine is operating; wherein
   the controller communicates with the management server and receives the information of the engine start-up suppressing area to suppress the engine start, which has been identified on map data based on the engine operating information, and wherein the controller sets an engine start threshold to start the engine based on the position information of the vehicle and the engine start-up suppressing area, the engine start-up suppressing area being a geographic area.

13. A hybrid vehicle control method for a hybrid vehicle having an engine and a motor/generator as power sources, the hybrid vehicle control method comprising:
   managing position information of the hybrid vehicle;
   transmitting engine operating information to a management server, the engine operating information including at least one of a moving distance and an operating time of the engine from a start of the engine to a stop of the engine during operation of the motor/generator, the engine operating information including an engine operation position indicative of a point at which the engine is operating;
   receiving information of an engine start-up suppressing area to suppress an engine start, which has been identified on map data based on the engine operating information that was transmitted, and
   controlling the engine start of the engine by setting an engine start threshold to start the engine based on the position information of the vehicle and the engine start-up suppressing area.

* * * * *